(12) United States Patent
Heiden et al.

(10) Patent No.: US 7,939,789 B2
(45) Date of Patent: May 10, 2011

(54) METHOD FOR REPRODUCIBLY DETERMINING GEOMETRICAL AND/OR OPTICAL OBJECT CHARACTERISTICS

(75) Inventors: Michael Heiden, Woelfersheim (DE); Klaus Rinn, Heuchelheim (DE); Andreas Schaaf, Mittenaar-Bicken (DE)

(73) Assignee: Vistec Semiconductor Systems GmbH, Weilburg (DE)

( * ) Notice: Subject to any disclaimer, the term of this patent is extended or adjusted under 35 U.S.C. 154(b) by 142 days.

(21) Appl. No.: 12/228,583

(22) Filed: Aug. 14, 2008

(65) Prior Publication Data
US 2009/0045318 A1  Feb. 19, 2009

(30) Foreign Application Priority Data
Aug. 17, 2007 (DE) .................. 10 2007 039 021

(51) Int. Cl.
*H01L 27/00* (2006.01)
*G01J 1/44* (2006.01)
(52) U.S. Cl. ................ 250/208.1; 250/214 C
(58) Field of Classification Search .......... 250/208.1, 250/226, 216, 221, 214 C; 348/294, 296, 348/302, 336, 340
See application file for complete search history.

(56) References Cited

U.S. PATENT DOCUMENTS

| 5,047,861 | A | * | 9/1991 | Houchin et al. ............. 348/247 |
| 6,191,408 | B1 | * | 2/2001 | Shinotsuka et al. ....... 250/208.1 |
| 6,323,953 | B1 | | 11/2001 | Blaesing-Bangert et al. 356/614 |
| 6,825,939 | B2 | | 11/2004 | Rinn ............................. 356/636 |
| 7,048,912 | B2 | * | 5/2006 | Plochocka ..................... 424/49 |
| 2008/0284889 | A1 | * | 11/2008 | Kinoshita ..................... 348/308 |

FOREIGN PATENT DOCUMENTS

| DE | 257 324 A1 | 6/1988 |
| DE | DD 257 324 A1 | 6/1988 |
| DE | 42 18 971 | 12/1993 |
| DE | 198 19 492 | 11/1999 |
| DE | 101 31 897 | 1/2003 |
| WO | WO 2007 036 756 | 4/2007 |

* cited by examiner

*Primary Examiner* — Que T Le
*Assistant Examiner* — Pascal M Bui-Pho
(74) *Attorney, Agent, or Firm* — Davidson, Davidson & Kappel, LLC (57) ABSTRACT

A method for reproducibly determining object characteristics is disclosed. Herein an object is imaged onto a detector by means of an imaging optics and detected thereon. A correction function k is applied to a brightness measuring result N originally detected by a detector in such a way, that a corrected brightness measuring result N' is proportional to a brightness I impinging on the detector.

15 Claims, 8 Drawing Sheets

METHOD FOR REPRODUCIBLY DETERMINING GEOMETRICAL AND/OR OPTICAL OBJECT CHARACTERISTICS

This claims the benefit of German Patent Application No. 10 2007 039 021.3, filed on Aug. 17, 2007 and hereby incorporated by reference herein.

The present invention relates to a method for reproducibly determining object characteristics.

BACKGROUND

Methods for the detection of objects of the generic type are already well known from the practice. Object characteristics can be, for example, the width, the position and the brightness of the structure on the object and/or the brightness of the object itself. All the characteristics referred to are ultimately based on the detection of brightness, since the accuracy with which a width and a position of an object is obtained is also determined by the varying brightness or detected brightness.

In industrial applications, such as in the metrology of line widths or positions on substrates in the semiconductor industry, coordinate measuring machines are utilized of the type described, for example, in German Patent Application DE 198 19 492. This measuring device is used for high-precision measurement of the coordinates of structures on substrates, for example, masks, wafers, flat panel displays and vapor deposited structures, in particular however, for transparent substrates. The coordinates are determined relative to a reference point to within just a few nanometers. Herein, for example, an object is illuminated with light from a mercury-vapor lamp and is imaged onto a CCD chip of a camera by means of an imaging optics. The CCD chip usually records a plurality of images of the same object using the same exposure time. It is thus of particular importance that the varying brightness (intensity) of the light source generates a linear response on the detector.

German Patent Application DE 101 31 897 also deals with the problem of varying results obtained from the repeated measurement of position and in particular line widths of the coordinate measuring machine using different exposure times and/or with varying brightness emitted by the light source. In this patent application, the problem is solved by variations in the imaging process, more precisely by applying an averaging procedure to the varying error amount, to reduce the error source. In practice, however, the residual error is still relatively large even after error reduction.

In the search for new solutions with smaller residual errors, it should be kept in mind that fluctuations in the exposure time and/or fluctuations in the brightness of the light source are unavoidable, even if reduced to a low level. One reason for this residual error is the non-linearity of the detector or light sensor (the CCD chip of a camera in the case of a coordinate measuring machine), which depending on the brightness emitted by the light source changes the form of the detected image to such an extent that variations in the values measured on the structures arise. If repeatable measurements for the determination of object characteristics (e.g. position, line width and brightness) are to be made, then the measuring results for the object characteristics must be free of these influences. For the qualitative measurement of an image, in particular—but not only—for the position and line width measurement on semiconductor substrates, the measuring result should therefore only be influenced by the object, e.g. a wafer or a mask, rather than by the randomness of the measuring process such as, for example, the exposure time and the brightness emitted by the light source.

As is well known from general technical knowledge, there are evaluation algorithms which independent of the original brightness measuring result N and the values obtained for black (no light), always deliver the same result for the position and in particular for line widths of structures. Mathematically formulated, the result is thus independent of a linear transformation of the originally detected brightness measuring results. If the originally detected brightness measuring results N are transformed by a freely selectable linear function such as $N'=aN+b$ with linearity parameters a and b, the result, for example the line width and the line position, does not change. Thus all the linear variations of the originally detected brightness measuring results are practically harmless with regard to a possible deformation of the detected image.

This linear transformation of the originally detected brightness measuring results N is in most cases only approximate, however. On the contrary existent measuring systems, such as the light sensor mentioned above, exhibit non-linearities which are small in the case of a good system, but which cannot be disregarded when a very precise measurement is required.

SUMMARY OF THE INVENTION

It is an object of the present invention to provide a method for correcting the non-linearity in a measuring result obtained for a characteristic of an object, while avoiding the disadvantages presented by methods of the prior art.

In accordance with an embodiment of the present invention, the above object is solved by a method for reproducibly determining object characteristics including the following steps:

imaging an object onto a detector by means of an imaging optics and detecting the object thereon; and applying a correction function k to a brightness measuring result N originally detected by the detector in such a way, that a corrected brightness measuring result N' is proportional to a brightness I impinging on the detector.

The advantages provided by the above referenced embodiment are, in particular, that corrected brightness measuring results N' are determined with the inventive method, which correct the non-linearities of a measuring result for a characteristic of an object, while having a smaller residual error in determination of the object characteristic than is the case in methods according to the prior art. The reduction of the residual error enables the object characteristics to be determined in a reproducible way, for example, the same measuring values for the position, line width and/or brightness of the structures on the object are determined irrespective of the non-linearity of the detector or the light sensor.

The inventive method for reproducible determination of object characteristics is of particular advantage in this case. Herein the object is first imaged onto a detector using an imaging optics and is then detected. The object can be located on a substrate. A correction function k(N) is then applied to a brightness measuring result N originally detected by the detector in such a way, that a corrected brightness measuring result N' is linear to the brightness I impinging on the detector. Determination of the correction function k(N) and the corrected brightness measuring results N' is described in detail in the preferred embodiments.

The brightness I of the light emitted by a light source can, for example, be from a laser, an LED, a plurality of LED's or from an incoherently illuminating light source, such as a light bulb, a mercury-vapor lamp or an arc lamp. The type of lamp used is irrelevant to the invention and should not be conceived as limiting to the invention.

The detector can have various forms. The detector can include a plurality of detector elements. In a simple embodiment not shown, the detector is, for example, a single detector, i.e. including one element. According to another embodiment the detector is a CCD row, including M pixels as detector elements. In a particular embodiment the CCD row is a TDI sensor. In both embodiments the detector is 1-dimensional and the i-th detector element detects a brightness measuring result $N_j$ (where $j=1, \ldots, M$). The detector can, however, also be 2-dimensional. For example in one embodiment, the detector is a 2-dimensional CCD chip, including L lines of M detector elements each, wherein the individual detector elements are the pixels of the detector. Herein the j-th detector element of the i-th line detects a brightness measuring result $N_{ij}$ (where $i=1, \ldots, L$ and $j=1, \ldots, M$). To simplify illustration of the invention each detector row always has the same number of M detector elements in the following, this should not, however, be conceived as limiting to the invention, as detectors including different numbers of detector elements per line can also be utilized with the inventive method.

In the following for further simplification, tuples will be used as indices of the functions N, N' and K (i; j) irrespective of whether the detector is 1-dimensional or 2-dimensional. The special case of a 1-dimensional detector can be derived, by setting $L=1$, for example setting $K_{1j}=K_j$.

The correction function $k(N)$ can be determined using various methods, it is usually determined by a defined change to the brightness I impinging on the detector. According to one embodiment the changes can be determined by positioning a transmission filter or a reflection filter with defined transmission or reflection characteristics in the beam path in front of the detector. If a light source for illumination of the object is provided, in a further embodiment the changes can be determined by means of the brightness I emitted by the light source. In a preferred embodiment changes are determined by a defined change to the exposure time of the detector. According to a particular embodiment the defined change to the exposure time of the detector is crystal-controlled. In a further embodiment changes to the brightness measuring results N originally detected by the detector are determined by placing a calibrated gray filter at a defined position in the illumination beam path behind the light source. In an alternative embodiment changes are determined by placing a calibrated gray filter at a defined position in the detection beam path in front of the detector. The method used to define a change to brightness I impinging on the detector is irrelevant to the present invention and should not be construed as limiting to the invention, however, means and methods will preferably be used that minimize non-linearities.

Furthermore, the correction function $k(N)$ can be determined according to known mathematical procedures. It can be, for example, additive with regard to the original detected brightness measuring result N as described in one embodiment. It goes without saying that the correction functions $k(N)$ can also be multiplicative, for example, or can be other correction functions according to a well-known mathematical procedure for determining correction and residual error functions. The embodiments of the correction and residual error functions described are not to be conceived as limiting to the invention.

According to a further embodiment an individual correction function $k_{ij}(N)$ is applied to each of a plurality (L*M) of detector elements. According to a preferred embodiment the same correction function $k_i=k_{i1}=k_{i2}=k_{i3}=\ldots=k_{iM}$ is used on each of the M detector elements of an i-th detector row. In another embodiment the same correction function $k=k_{11}=k_{12}=k_{ij}=\ldots=k_{LM}$ is used on each of the M detector elements across all the detector rows of the CCD chip. Since the non-linearities in the measuring result of brightness I are small, in particular in the preferred embodiment, where changes to brightness I impinging on the detector are determined by a defined and crystal-controlled change to the exposure time of the detector, the non-linearities can usually be compensated for by the same correction function k across all (i; j).

There are numerous ways of advantageously developing and improving the teachings of the present invention. Here, reference is made on the one hand to the claims dependent on claim 1 and on the other hand to the subsequent explanation of a preferred exemplary embodiment of the invention with reference to the drawings. In conjunction with the description of the preferred exemplary embodiment of the invention with reference to the drawings, generally preferred embodiments and improvements to the teachings will also be explained.

BRIEF DESCRIPTION OF THE DRAWINGS

FIG. 6-1 is a schematic flow chart of the first part of an embodiment of the method according to the present invention;

FIG. 6-2 is a schematic flow chart of the second and last part of the embodiment of the method according to the present invention;

DETAILED DESCRIPTION

Figure 1:
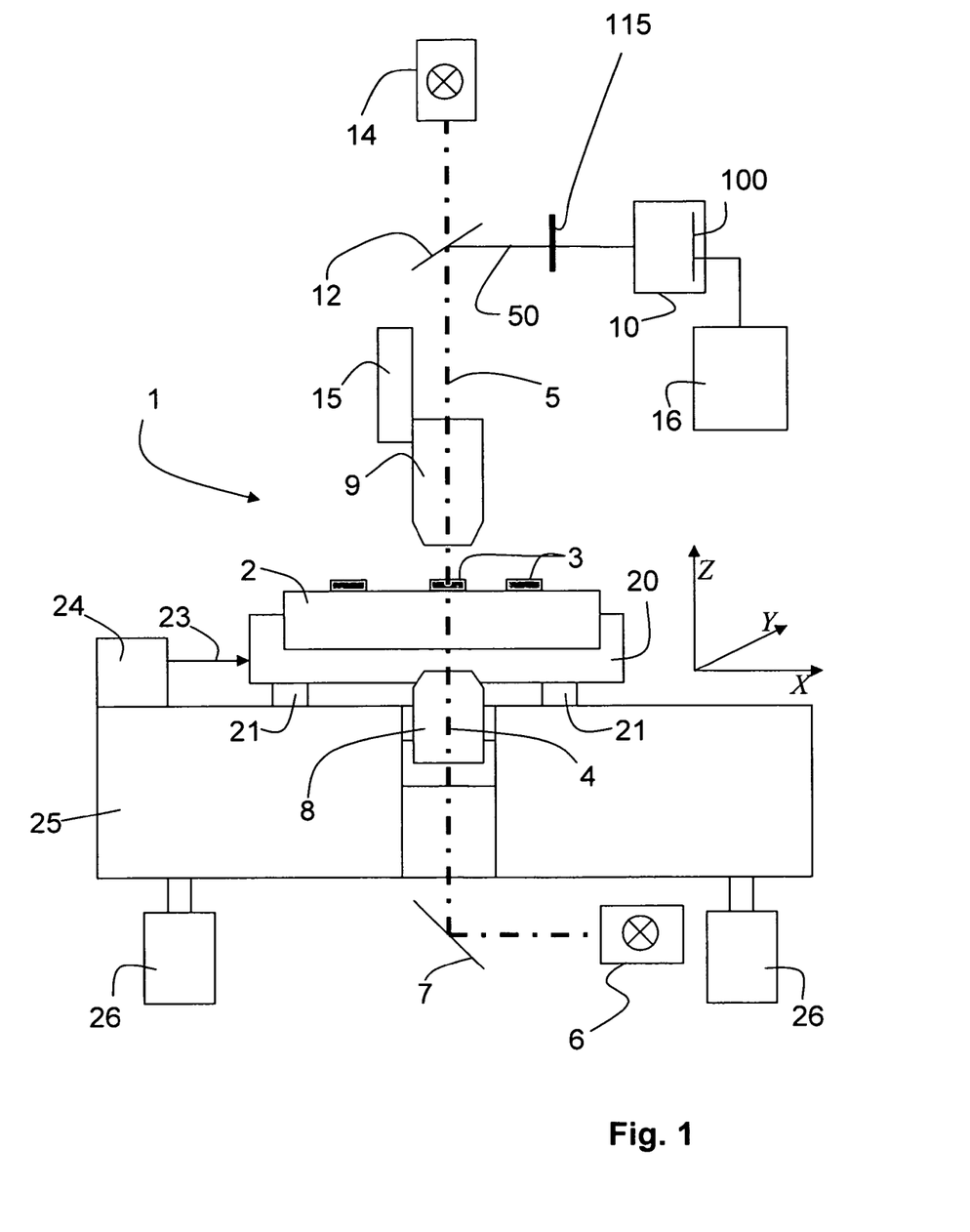
FIG. 1 shows a schematic layout of a coordinate measuring machine according to the prior art.

FIG. 1 shows a coordinate measuring machine 1, as it has been used for some time in the prior art for measuring structures on masks and/or wafers. Substrates 2 can be optically inspected and measured using the coordinate measuring machine 1 of the exemplary embodiment shown in FIG. 1. A substrate 2 according to the present invention is, for example, a mask or a wafer used for the manufacture of semiconductors. A plurality of objects 3 are applied to a substrate 2, which can be measured with the aid of coordinate measuring machine 1. Coordinate measuring machine 1 includes two illumination beam paths 4 and 5, wherein illumination beam path 4 is provided for the transmitted-light mode, and illumination beam path 5 is provided for the incident-light mode. A light source 6 is provided for the transmitted-light mode, which passes the light via a mirror 7 towards a condenser 8. The light in illumination beam path 4 passes through substrate 2 and is at least substantially collected by an imaging optics 9 and is imaged onto a detector 10 via a beam splitter 12.

Detector 10, in the embodiment shown here, is a CCD chip 100 for converting the optical signals collected by imaging optics 9 into electric signals. Further, in incident-light beam path 5, a light source 14 is also provided for illuminating structure 2 or objects 3. Imaging optics 9 is equipped with a focusing means 15 for moving imaging optics 9 in the Z coordinate direction. This is how structures 3 on the substrate may be recorded by imaging optics 9 in different focusing planes. In the same manner it is possible to displace condenser 8 in the Z coordinate direction.

The CCD chip 100 of detector 10 is connected to a computer evaluation unit 16 with which the data obtained by the CCD chip 100, can be read out and processed accordingly. The computer and evaluation system 16 is also for controlling a measuring stage 20 in the Y coordinate direction and the X coordinate direction.

Detector 10 measures the brightness I emitted by light source 6 or 14 and using the computer evaluation unit 16 determines brightness measuring results N therefrom. To be able to distinguish between these brightness measuring results N and the linear brightness measuring results N' determined using the inventive method, the brightness measuring results N determined by detector 10 will be referred to as original detected brightness measuring results N.

Substrate 2 is on a measuring stage 20, which is moveably supported, as already mentioned, in the X and Y coordinate directions. The movement of measuring stage 20 is via air bearings 21. A laser interferometer system 24 is only schematically indicated, allowing the position of measuring stage 20 to be interferometrically determined by means of a light beam 23. Measuring stage 20 is positioned on a granite block 25 by means of air bearings 21 in a substantially frictionless manner and can therefore be moved in the X and Y coordinate directions. Granite block 25 itself rests on vibration-damped legs 26.

Figure 2:
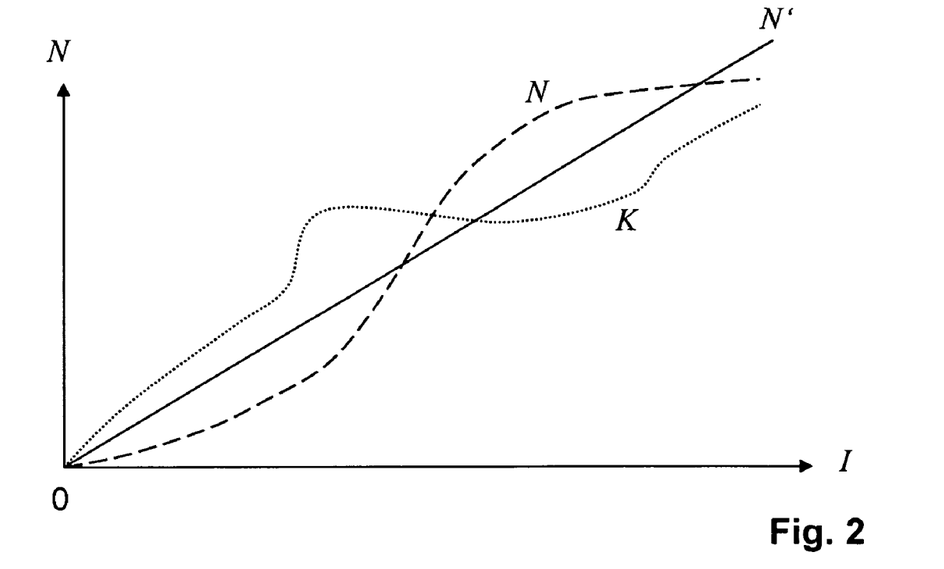
FIG. 2 is a diagram of the typical development of the original detected brightness measuring results N, corrected brightness measuring results N' and a correction function k.

FIG. 2 is a diagram to illustrate the development of originally detected brightness measuring results N, corrected brightness measuring results N' and a correction function k(N). The following description refers to a detector 10 including a plurality of detector elements in a 2-dimensional arrangement. It goes without saying for a person skilled in the art, that the invention can also be implemented with other types of detector.

First the brightness $I_{ij}$ is discussed for each detector element (i; j), i=1, ..., L and j=1, ..., M.

Detector 10 generates the brightness measuring results $N_{ij}$ from the brightnesses $I_{ij}$. The measurement is described by a measuring function $F_{ij}:N_{ij}=F_{ij}(I_{ij})$. If the intensities $I_{ij}$ are known as well as of course the measuring results $N_{ij}$, then it is possible using known mathematical procedures to approximately determine the function $F_{ij}(I_{ij})$ for interpolation and extrapolation, as shown for example, in FIG. 2. For the reasons explained earlier (such as the non-linearity of detector 10 or the light sensor) $F_{ij}(I_{ij})$ is in practice not typically a linear function of brightness $I_{ij}$. Ideally corrected brightness measuring results $N_{ij}'$ should be used, as depicted in FIG. 2, wherein $N_{ij}'$ is proportional to brightness $I_{ij}$ and a linear response is thus formed on detector 10 responsible for measuring brightness $I_{ij}$. Thus the question arises, of how the available non-linear original detected brightness measuring results $N_{ij}$ can be converted into ideal, i.e. linear, corrected brightness measuring results $N_{ij}'$. Mathematically formulated, a correction function $k_{ij}$ (not shown in FIG. 2) has to be determined for $N_{ij}$, so that the following applies: N'=k(N).

The desired linearity of $N'_{ij}$ can be expressed by a constant calibration factor $\alpha_{ij}$ and the brightness $I_{ij}$ impinging on detector element $110_{ij}$:

$$N'_{ij} = k(N_{ij}) \underset{\text{as equal as possible}}{\approx} \alpha_{ij} I_{ij} \qquad (G1)$$

Ideally the calibration factor $\alpha_{ij}$ applies to all detector elements, i.e. is as alike as possible for all i,j, that is $\alpha_{ij}=\alpha$:

$$N'_{ij} = k(N_{ij}) \underset{\text{as equal as possible}}{\approx} \alpha I_{ij} \qquad (G2)$$

In this case, "as equal as possible" means that with the same quantity of impinging light the detector elements all produce the same measuring result. No statement need be made about the size of a since it is a linearization and not an absolute calibration. This objective can be approached with the correction functions $k_{ij}$ which are additive in the embodiments described below. This can be expressed as follows:

$$N'_{ij}=k_{ij}(N_{ij})=N_{ij}+K_{ij}(N_{ij}) \qquad (G3)$$

Figure 61:
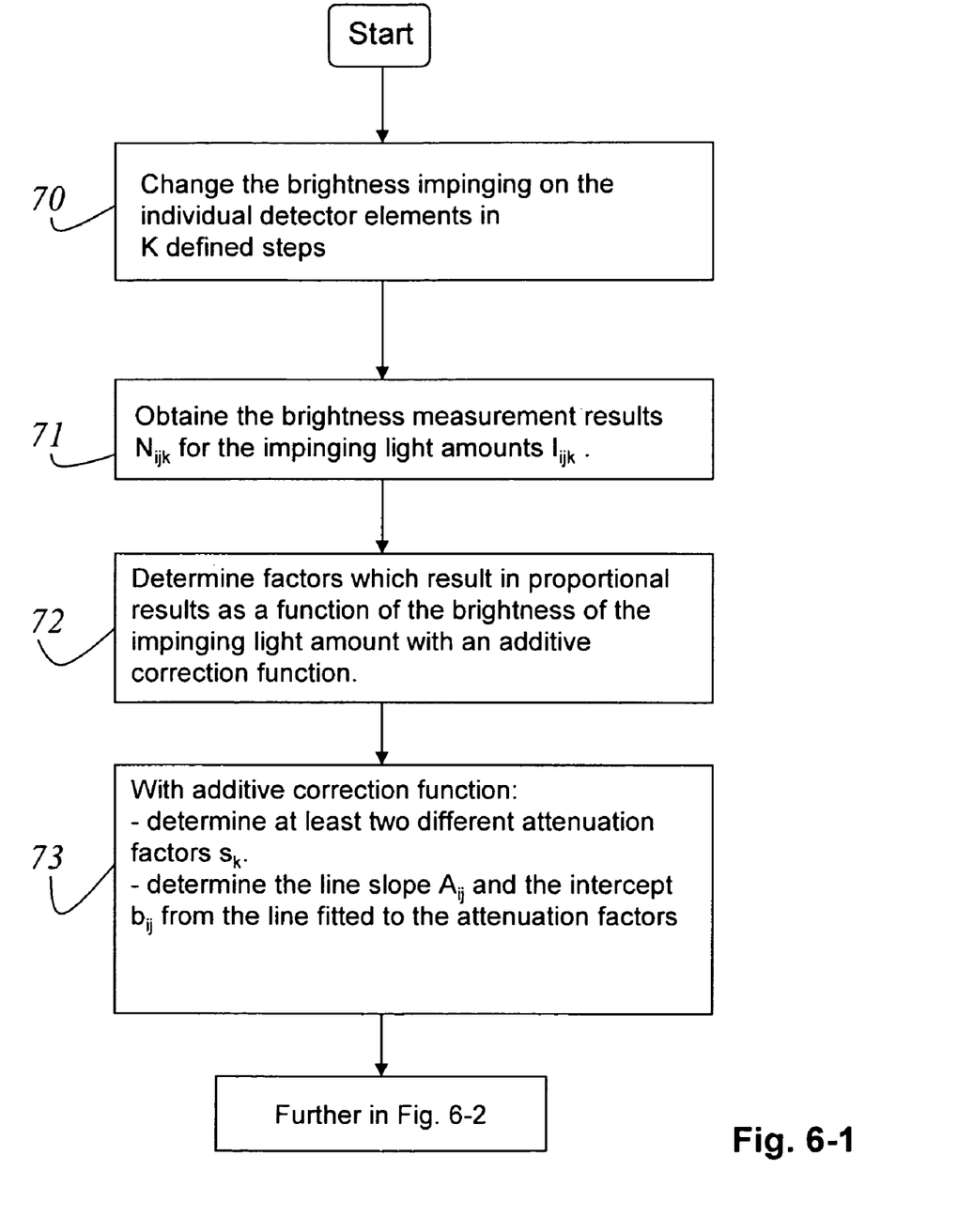
Figure 62:
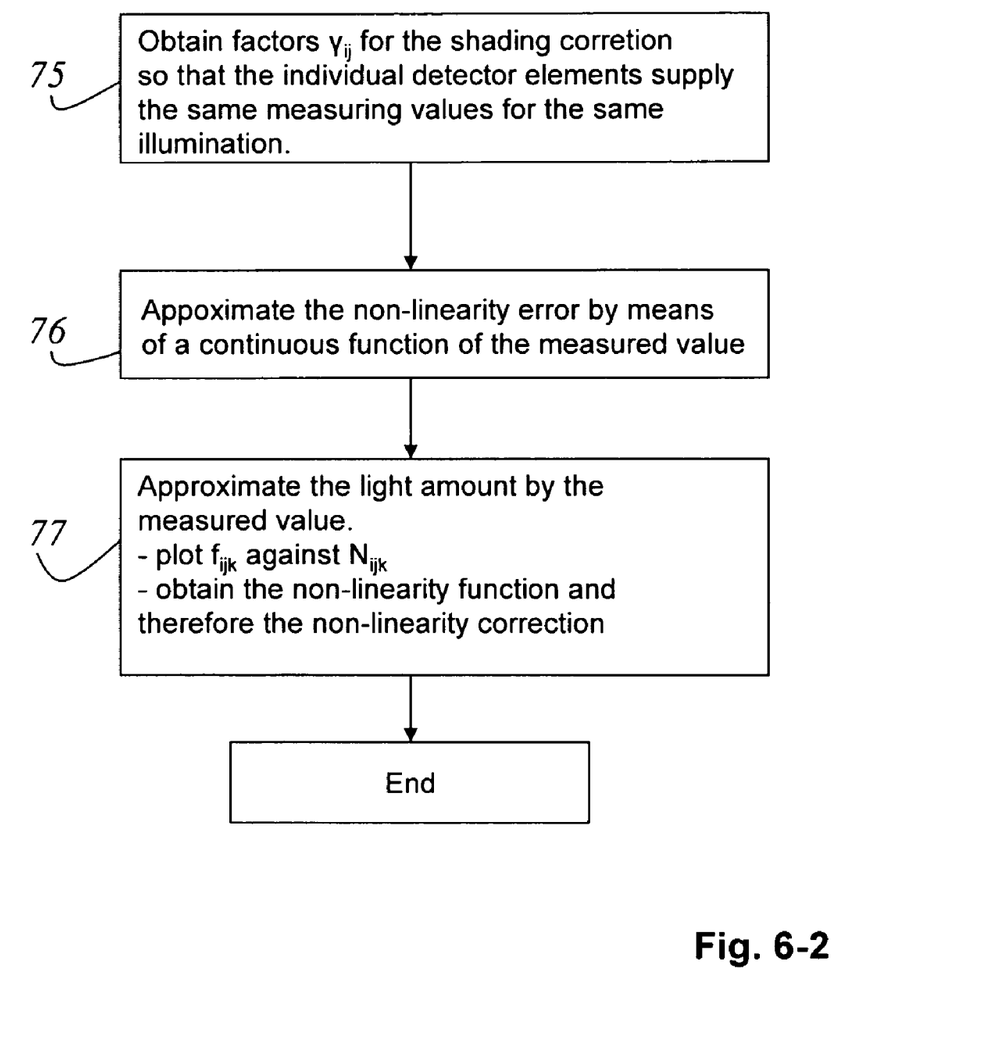

The procedural steps involved in determining $k_{ij}$ are illustrated in FIGS. 6-1, 6-2 and 7.

Figure 3:
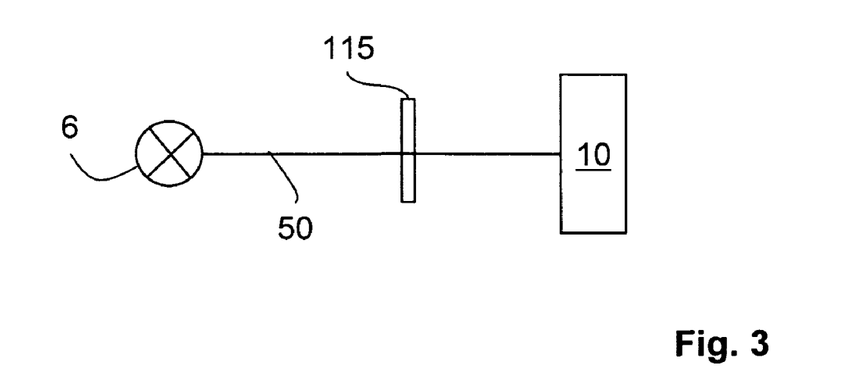
FIG. 3 is a schematic representation of a light source and a detector for imaging an object, wherein a transmission filter or reflection filter is positioned in the beam path in front of the detector.

FIG. 3 is a diagram of a light source 6 and a detector 10 for recording images of an object 3, wherein a filter 115 is positioned in front of detector 10 in detection beam path 50. This filter is to reduce the light for all the detector elements to the same fraction. The correction functions $K_{ij}(N_{ij})$ can be determined if these transmissions are known.

As previously described, embodiments other than the embodiment illustrated in FIG. 3 are also possible (not shown in the figures), wherein changes are determined using other means, for example, by positioning a reflection filter with defined reflection characteristics in detection beam path 50 in front of detector 10 instead of a transmission filter with defined transmission characteristics. Herein a plurality of varying and calibrated filters can be arranged on a filter wheel, which positions each required filter in the beam path. It is also conceivable to vary brightness I emitted by light source 6 or 14 or to vary the exposure time of detector 10.

The embodiment allowing the exposure time of detector 10 to be defined and changed in a crystal-controlled manner is preferably realized, as the crystal-controlled exposure time can be determined very precisely. The error resulting from the utilization of an identical brightness I over varying time periods instead of varying brightnesses I over the same time periods is very small in the CCD chip 100 used in this case.

Figure 4:
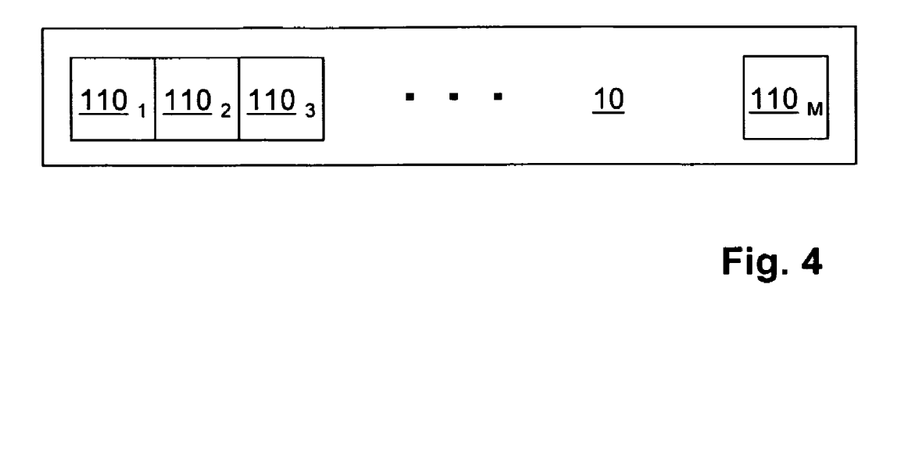
FIG. 4 is a schematic representation of a detector, wherein the detector is a CCD row including M pixels as detector elements.

FIG. 4 is a diagram of detector 10, wherein detector 10 is a CCD row including M pixels as detector elements $110_1$, $110_2$, ..., $110_M$. As already explained above, detector 10 can be of any form. In a particular embodiment the CCD row is a TDI sensor (not shown). In both these embodiments the detector is 1-dimensional and every j-th detector element $110_j$ each detects a brightness measuring result $N_j$, where j=1, ..., M.

Figure 5:
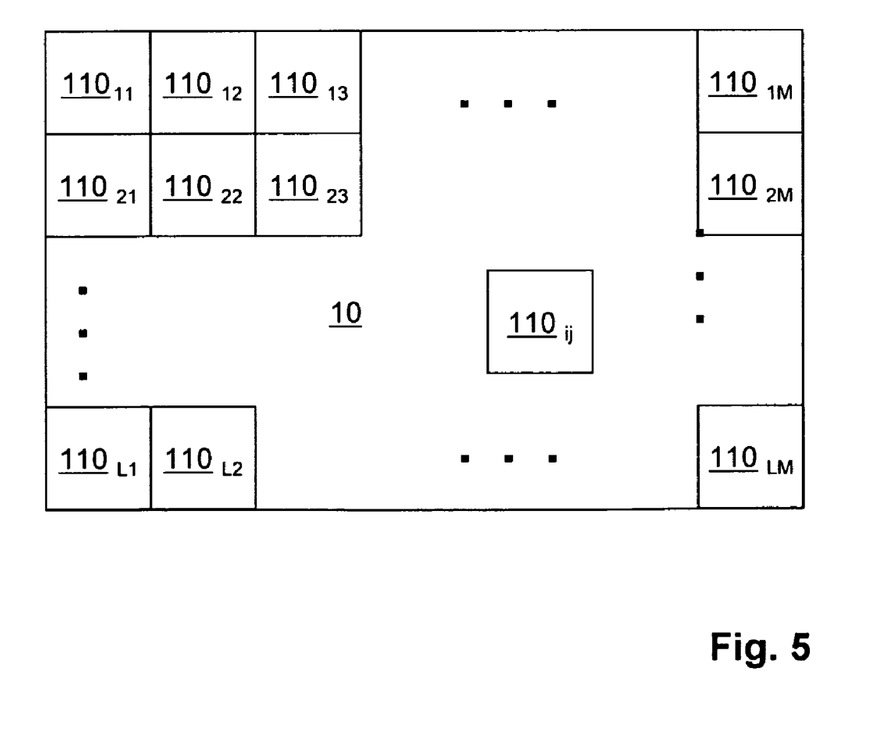
FIG. 5 is a schematic view of a 2-dimensional CCD chip as a detector.

FIG. 5 is a schematic view of a 2-dimensional CCD chip 100 as detector 10, which in contrast to the embodiment depicted in FIG. 4 is 2-dimensional. In this embodiment the detector elements 110 are arranged in rows, with L rows each including M detector elements 110, wherein the individual detector elements 110 are the pixels of detector 10. Herein the j-th detector element $110_{ij}$ of the i-th row detects a brightness measuring result $N_{ij}$ (i=1, . . . , L and j=1, . . . , M).

FIG. 6-1 is a schematic flow chart illustrating the steps S10 to S30 of the first part of an embodiment of the method according to the present invention. The individual steps of the method according to the present invention will be described in detail below.

In a first step 70, the brightness $I_{ij}$ is defined for all the detector elements (i; j) by changing the brightness emitted by light source 6 (transmitted light) or by light source 14 (incident light). It is also possible to change the brightness $I_{ij}$ impinging on the detector in a defined manner. The brightness $I_{ij}$ (emitted by light source 6 or 14 or impinging on detector 10) can be defined using, for example, the methods or means described with reference to FIG. 3. Herein the brightness $I_{ijk}$ is changed in K well defined steps, k=1, . . . , K, via a factor $s_k$ relative to the initial brightness $I_{ij1}$:

$$I_{ijk}=s_k \cdot I_{ij1} \quad (G6)$$

In next step 71, the brightness measuring results $N_{ijk}$ for the quantities of incident light $I_{ijk}$ are determined for all the detector elements (i; j) by means of a detector 10, as described with reference to FIG. 1.

A next step 72 can be derived from the following explanations: Changing the brightness $I_{ijk}$ emitted by light source 6 or 14 in K steps produces K images of the detected object 3 with the brightness measuring results $N_{ijk}$.

A correction function to be determined, and presumed additive for this example, should produce results proportional to the quantity of incident light $I_{ijk}$ in accordance with equations G2, G3, G6:

$$N_{ijk}+K_{ij}(N_{ijk})=\alpha \cdot I_{ijk}=\alpha \cdot s_k \cdot I_{ij1} \quad (G7)$$

Hence, for a selected detector element there is now only one unknown value $I_{ij1}$ instead of K unknown brightnesses $I_{ijk}$. This value $I_{ij1}$ is just as unknown as the calibration factor $\alpha$.

Solving the equation G7 for $K_{ik}(N_{ijk})$ results in:

$$K_{ij}(N_{ijk})=\alpha \cdot s_k \cdot I_{ij1}-N_{ijk} \quad (G8)$$

This equation indicates: The correction function is the difference between the attenuation coefficient multiplied by a still unknown detector-dependent number and the measuring results.

In practice, the measuring function $F_{ij}(I)$ from which the brightness measuring results N are derived, can be presumed to be virtually linear. That is, there is a small residual error function $f_{ij}(I)$, and a line function $\alpha_{ij}I+b_{ij}$, so that:

$$N=F_{ij}(I)=\alpha_{ij}I+b_{ij}+f_{ij}(I)$$

or with the light quantity $I_{ijk}$ for the detector element (i; j) in image k with attenuation $s_k$:

$$N_{ijk}=F_{ij}(I_{ijk})=\alpha_{ij}I_{ijk}+b_{ij}+f_{ij}(I_{ijk}) \quad (G9)$$

$f_{ij}(I)$ describes the deviation of the detector from linearity. The division of the measuring function into a linear part $\alpha_{ij}I+b_{ij}$ and a residual error $f_{ij}(I)$ is relatively arbitrary and is dependent on the specific procedure used to determine the linearity parameters $\alpha_{ij}$ and $b_{ij}$. The only condition is that $f_{ij}(I)$ is small, whereby it doesn't have to be the smallest possible.

The quantities of light I impinging on the detector element are not known, we do know, however, (see G6) the ratios of the different measurements to one another, given by the attenuation factors $s_k$. Using G6, G10 can thus be converted to:

$$N_{ijk}=F_{ij}(I_{ijk})=\underbrace{a_{ij}I_{ij1}}_{A_{ij}}s_k + b_{ij} + f_{ij}(I_{ijk}) \quad (G10)$$

If, for a given detector element the measuring value $N_{ijk}$ is plotted against $s_k$ (for all k=1, . . . , K), then this curve can be approximated by a straight line (see step 73 in FIG. 6-1), with slope $A_{ij}$ and intercept $b_{ij}$, as well as non-linearity function $f_{ij}(I)$. This can, for example, be determined as follows:

Defining a straight line to extend through the two associated original detected brightness measuring results $N_a$ and $N_b$ for the two values $s_a$ and $s_b$.

The largest and the smallest $s_k$ would be a particularly good choice.

Alternatively, a straight line approximation according to the least squares method or any other standard for finding the deviation between a straight line and the brightness measuring results, would be a good choice.

In this way intercept $b_{ij}$ is thus already determined for G9 as well. We have also gained information about residual error function $f_{ij}(I)$, as we have established the deviations for the discrete unknown quantities of light $I_{ijk}$, as seen according to the following conversion of G11:

$$f_{ijk}=f_{ij}(I_{ijk})=N_{ijk}-A_{ij}s_k-b_{ij} \quad (G11)$$

This result is also obtained mathematically, if G10 and G11 are set in G8 and with G6 the correction function is written as:

$$K_{ij}(N_{ijk})=\alpha I_{ijk}-\underbrace{a_{ij}I_{ijk}}_{A_{ij}s_k}-b_{ij}-f_{ijk}=I_{ijk}\underbrace{(\alpha-a_{ij})}_{x_{ij}}-b_{ij}-f_{ijk} \quad (G12)$$

The correction function at the discrete positions $N_{ijk}$ is thus given for the quantity of light, apart from an unknown multiplication factor $x_{ij}$.

The determination of this factor can be done in any desired way. The objective was not an absolute calibration but just a linearization. Following correction only a value proportional to the intensity must be determined. This can be seen if G12 is substituted in G7:

$$N_{ijk}+I_{ijk}x_{ij}-b_{ij}-f_{ijk}=\alpha \cdot I_{ijk} \Leftrightarrow$$
$$N_{ijk}-b_{ij}-f_{ijk}=\underbrace{(\alpha-x_{ij})}_{proportionality\ factor} \cdot I_{ijk}$$

Hence, correction with $x_{ij}=0$ or $N'_{ijk}=N_{ijk}+K_{ij}(N_{ijk})$ with $K_{ij}(N_{ijk})=-b_{ij}-f_{ijk}$ already linearizes the measurements for an individual detector element. Thus in contrast to well known methods used in the prior art, a method has been found that reduces the linearity error.

In the case of a plurality of detector elements (i; j) it should be provided in the preferred embodiment that all the detector elements have uniform sensitivity. The well-known shading correction mechanisms can be implemented here (cf. step 75). Observe, for example, a substrate with constant transmission (in transmitted light) with all detector elements. An error-free image should provide the same measuring results (const) for all the detector elements in this case. To achieve this, for example, for the measurement k=1, the linearized measuring results are multiplied by the individual factors $\gamma_{ij}$ for each detector element:

$$\text{const} = \gamma_{ij}(N_{ij1} - b_{ij} - f_{ij1})$$

The constants for shading correction are determined with:

$$\gamma_{ij} = \frac{\text{const}}{N_{ij1} - b_{ij} - f_{ij1}}$$

Thus a correction function according to G1 is obtained, with:

$$N'_{ijk} = k(N_{ijk}) = \gamma_{ij}(N_{ijk} - b_{ij} - f_{ijk}) \tag{G13}$$

Hence a non-linearity and shading correction for test measurements with defined light quantity variations (steps $s_k$) is carried out. This correction method must be generalized for use with any measured brightnesses. One possible approach is as follows:

The factors for shading correction $\gamma_{ij}$, as well as the correction of the intercept (black value) $b_{ij}$ can be taken directly from the test measurements. The data for the non-linearity errors $f_{ijk}$ relates, however, to the light quantity levels $s_k$, however, only the measured value $N_{ij}$ is given in the application. For this reason, the non-linearity error must be approximated using a continuous function of the measured value $\tilde{f}_{ij}(N)$ (see step 76). Since non-linearity is low and since, in practice, the fractions changing rapidly with the intensity are not so relevant, an approximation can be tolerated for the argument of the non-linearity function. The quantity of light is thus approximated using the measured value (see step 77).

Thus:

Plot $f_{ijk}$ against $N_{ijk}$.

A suitable interpolation function is an adequate approximation for the non-linearity function $\tilde{f}_{ij}(N)$.

Hence we have generalized G13 for any one of the measuring results of detector element (i; j) to:

$$N'_{ij} = k(N_{ij}) = \gamma_{ij}(N_{ij} - b_{ij} - \tilde{f}_{ij}(N_{ij})) \tag{G14}$$

More exact methods are also conceivable, e.g. iteration methods, which use a corrected result as an argument for a further non-linearity correction, i.e. G14 is applied iteratively.

Figure 7:
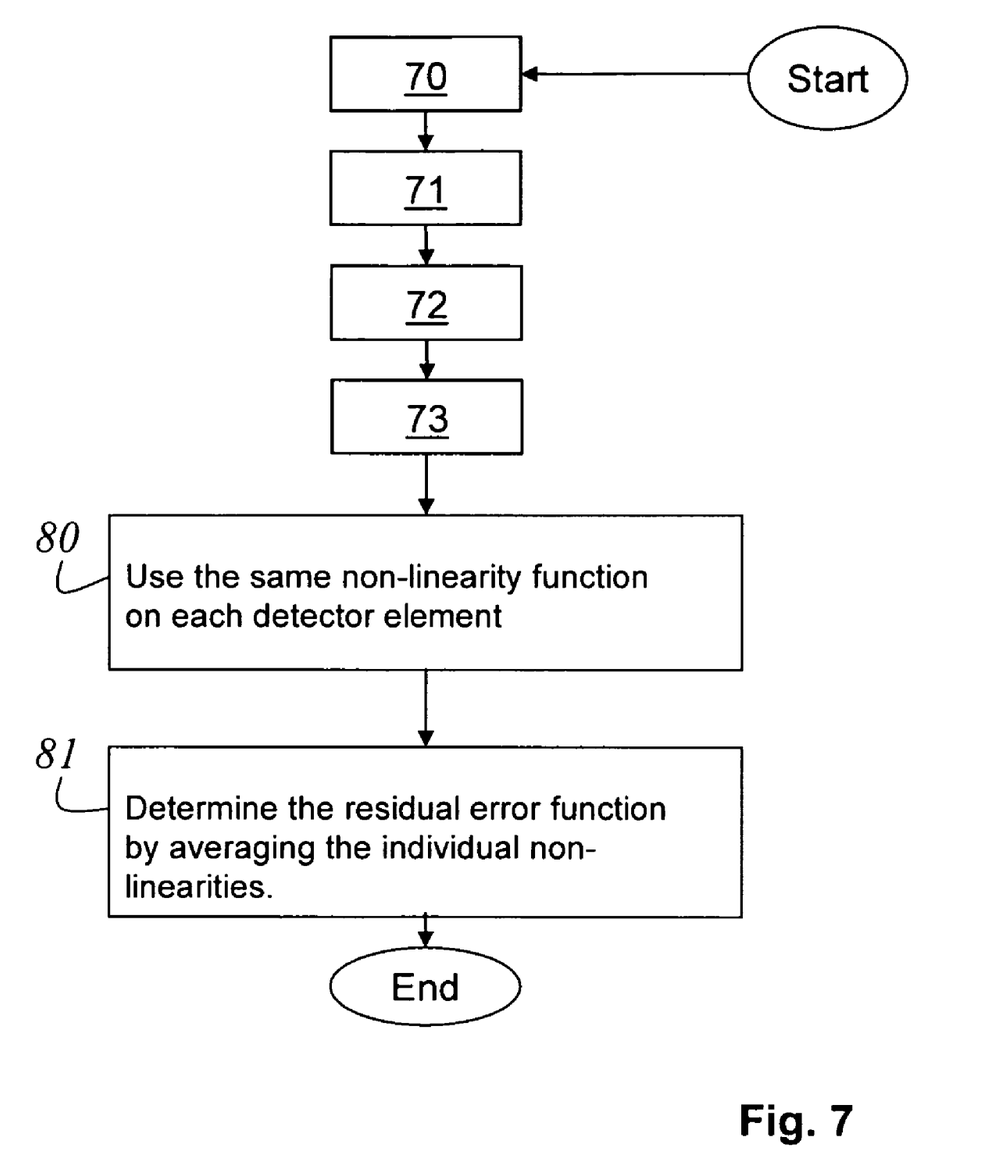
FIG. 7 is a schematic flow chart with a preferred embodiment of the method according to the present invention.

FIG. 7 is a schematic flow chart of a preferred embodiment of the method according to the present invention.

According to the embodiment described with reference to FIGS. 6-1 and 6-2, the correction function $k_{ij}(N)$ is calculated "individually" for each combination (i; j) and thus normally differs for each tuple (i; j). In a preferred embodiment the same non-linearity correction function $\tilde{f}_m(N)$ is used on each of the detector elements $110_{ij}$, with the same electronic processing stage (amplifier, analog-to-digital converter, etc.). In a more preferred embodiment the same non-linearity correction function $\tilde{f}(N)$ is used on each detector element $110_{ij}$ of CCD chip 100 (see step 80). To determine $\tilde{\eta}_m(N)$ or $\tilde{f}(N)$ the individual non-linearities can be averaged in different ways (see step 81). In a preferred embodiment, for interpolation of $\tilde{f}_{ij}(N)$ not only the $f_{ijk}$ of an individual detector element is plotted, but all of the elements with common electronics or the entirety of all $f_{ijk}$ describes the discrete values by means of suitable functions $\tilde{f}_m(N)$ or $\tilde{f}(N)$.

In the preferred embodiment of the inventive method the steps 70, 71, 72 and 73 correspond to the steps of the same name in the embodiment described with reference to FIGS. 6-1 and 6-2.

Figure 8A:
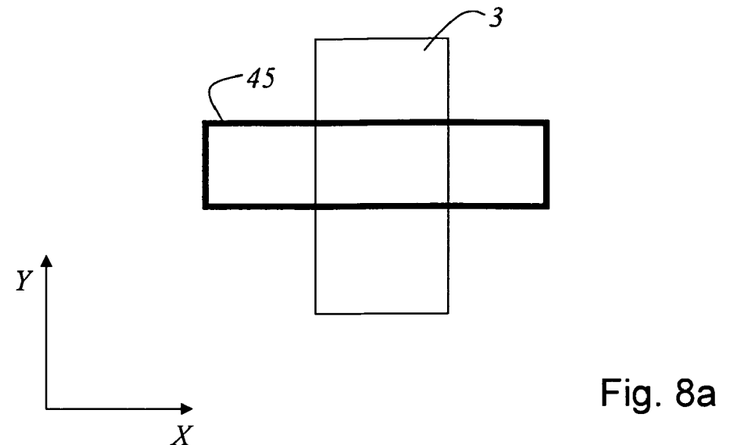
FIG. 8a is a spatial arrangement of a measuring window defined in a coordinate system of the CCD chip in relation to the object to be measured.
Figure 9:
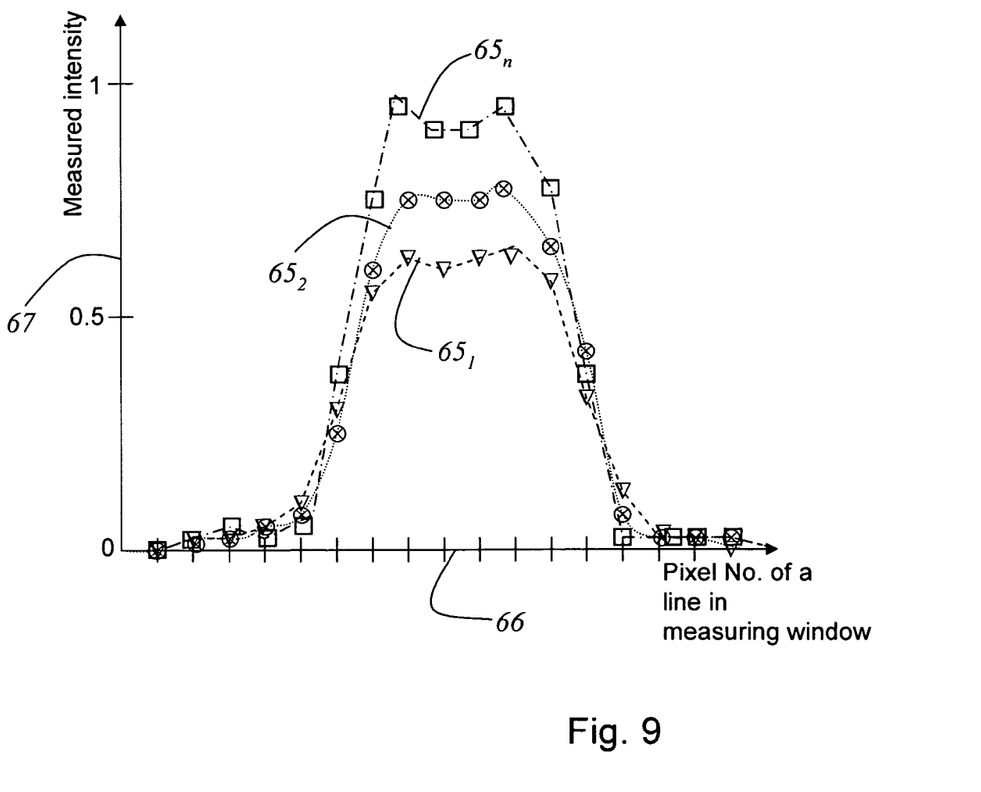
FIG. 9 is a schematic representation of a plurality of brightness profiles of an object, wherein the profiles have been imaged with varying brightnesses I.

FIG. 8a depicts the positioning of a measuring window 45 to an object 3 to be measured on substrate 2 (mask) for the manufacture of semiconductors. It will be understood by a person skilled in the art that object 3 can be of any form. Thus object 3 can, for example, include lines, spaces, dots, holes, hammerheads etc. As shown in FIG. 8a, at least a part of object 3 is located within measuring window 45. Measuring window 45 is comprised of a 2-dimensional arrangement of pixels (see FIG. 9). For imaging object 3 onto detector 10 or CCD chip 100 the recorded light signals are converted into electric signals. The graphic representation of the measured data is as shown in FIG. 9.

Figure 8B:
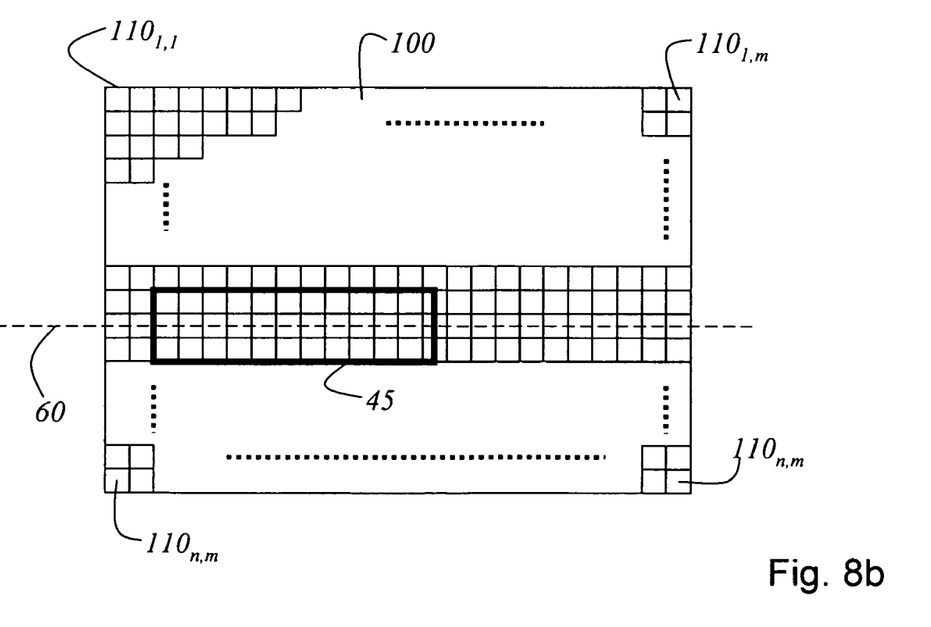
FIG. 8b is a measuring window defined on the CCD chip, wherein the measuring window includes a plurality of row sections.

FIG. 8b depicts the arrangement of measuring window 45 on CCD chip 100 of detector 10 used for coordinate measuring machine 1. CCD chip 100 includes a plurality of detector elements $110_{1,1}$; $110_{1,2}$ ... $110_{n,m}$, wherein the individual detector elements $110_{ij}$ are referred to as pixels or picture elements of detector 10 and thus form the 2-dimensional matrix arrangement. The measuring window 45 itself includes a plurality of pixels of detector 10. Herein the measuring window 45 does not have to correspond to an integral number of pixels, nor does it have to be aligned at a right angle to the detector grid. The measuring window 45 itself is smaller than CCD chip 100. The data determined within measuring window 45 or in pixel row 60 within measuring window 45 respectively, is transferred to a computer for calculation of a brightness profile. In principle it is sufficient to use just one pixel row 60 of measuring window 45 to evaluate object 3 imaged by the pixels of measuring window 45. Precise measurements for highest accuracy and repeatability require, however, maximum noise suppression in the measuring system with the greatest possible degree of averaging. For this purpose, measuring windows are selected such, that the measuring objects within the measuring window are translation invariant in the direction perpendicular to the measuring direction. Thus it is not the pixel row that is evaluated but the average value $\overline{N}_l$ with l=1, ..., M (or the result of another statistical evaluation procedure) in the translation invariant direction. Thus the average values are used instead of the pixels in the row.

A further simplification is thus possible in the case of common non-linear correction $\tilde{f}(N)$ of all detector elements. All the detector elements $110_{ij}$ have to be corrected for each i and j individually by subtraction of the black value $b_{ij}$:

$$\tilde{N}_{ij} = N_{ij} - b_{ij} \tag{G15}$$

These values are used for averaging:

$$\overline{N}_l = Av_l(\tilde{N}_{11}, \ldots, \tilde{N}_{MN})$$

Herein $Av_l(\tilde{N}_{11}, \ldots, N_{MN})$ is a function which supplies, for example, the average value $\overline{N}_l$ for the profile channel l from the corresponding pixel values of the measuring window. Subsequently, the common non-linearity function $\tilde{f}(N)$ is used on the average value and an averaged shading correction is substituted:

$$P_l = \overline{\gamma}_{l'}(\overline{N}_l - \tilde{f}(\overline{N}_l)) \tag{G16}$$

Herein the shading correction values $\gamma_{ij}$ were averaged to an average shading correction $\overline{\gamma}_l$ in the same way as the pixel values:

$$\overline{\gamma}_l = Av_l(\gamma_{11}, \ldots, \gamma_{MN}) \tag{G17}$$

The operation G16 is thus not used for every pixel value of the measuring window, but only on the 1/L th part for a window including L·M pixels. In practice, multiple measurements are predominantly made for the same measuring windows rendering the calculation of G17 less relevant.

According to a further embodiment of the invention, it is conceivable that an individual linear correction function $k_{ij}$ is used on each of the M detector elements $110_{ij}$, wherein the linear correction function $k_{ij}$, includes a slope $A_{ij}$ and an intercept $b_{ij}$, and wherein a common non-linear function $f(N)$ applies for all detector elements 110.

Finally, it should be noted in particular, that the previously described exemplary embodiments, only serve to describe the teachings claimed, and are not limiting to the exemplary embodiments. It is conceivable, however, that variations and modifications of the invention can be made without departing from the scope of protection of the appended claims.

What is claimed is:

1. A method for reproducibly determining object characteristics, comprising:
    imaging an object onto a detector using imaging optics and detecting the object thereon;
    determining a correction function k by positioning a filter in the beam path in front of the detector to determine a defined change to the brightness I impinging on the detector; and
    applying the correction function k to a brightness measuring result N originally detected by the detector, such, that a corrected brightness measuring result N' is proportional to a brightness I impinging on the detector;
    wherein the detector includes a plurality of detector elements;
    wherein a shading correction is carried out on the individual detector elements;
    wherein a common non-linearity correction function $\tilde{f}(N)$ is applied to all of the detector elements, wherein all the detector elements are corrected individually by subtraction of the black value ($b_{ij}$), and in that these values are used to form an average value, so that an average value ($\overline{N}_l$) formed from the corresponding pixel values of the measuring window is provided for a profile channel (l).

2. The method according to claim 1, wherein the detector is a CCD row comprising M pixels as the detector elements.

3. The method according to claim 2, wherein the CCD row is a TDI sensor.

4. The method according to claim 1, wherein the detector is a two-dimensional CCD chip, with L rows each including M detector elements, wherein the individual detector elements are the pixels of the detector.

5. The method according to claim 1, wherein the filter is a transmission filter or a reflection filter having defined transmission or reflection characteristics.

6. The method according to claim 1, wherein the changes to the brightness measuring results N originally detected by the detector are obtained from the brightness I emitted by a light source to illuminate the object.

7. The method according to claim 1, wherein the changes to the brightness measuring results N originally detected by the detector are determined by a defined change to the exposure time of the detector.

8. The method according to claim 7, wherein the defined change to the exposure time of the detector is carried out in a crystal-controlled manner.

9. The method according to claim 1, wherein the changes to the brightness measuring results N originally detected by the detector are determined by placing a calibrated gray filter at a defined position in the illumination beam path behind the light source.

10. The method according to claim 1, wherein the changes to the brightness measuring results N originally detected by the detector are determined by placing a calibrated gray filter at a defined position in the detection beam path in front of the detector.

11. The method according to claim 1, wherein the correction function k is additive.

12. The method according to claim 1, wherein each of the M detector elements of an i-th detector row detects a brightness measuring result $N_{ij}$, wherein an individual linear correction function $k_{ij}$ is used on each of the M detector elements.

13. The method according to claim 12, wherein P groups of P<M are assigned to each of the M detector elements, wherein the same correction function $k_P$ is used for all the detector elements of the group $p \in \{1, \ldots P\}$.

14. The method according to claim 13, wherein the same correction function k is used on each of the M detector elements.

15. The method according to claim 12, wherein an individual linear correction function $k_{ij}$ is used on each of the M detector elements, wherein the linear correction function $k_{ij}$ comprises a slope $A_{ij}$ and an intercept $b_{ij}$, and wherein a common non-linear function $f(N)$ applies for all detector elements.

* * * * *